United States Patent [19]

Shaddock

[11] 4,227,997

[45] Oct. 14, 1980

[54] MOBILE NON-POLLUTING CLEANING AND PROCESSING APPARATUS AND METHOD

[75] Inventor: Roland E. Shaddock, Streator, Ill.

[73] Assignee: Peabody-Myers Corporation, Streator, Ill.

[21] Appl. No.: 969,325

[22] Filed: Dec. 14, 1978

[51] Int. Cl.$^2$ .............................................. B07B 9/00
[52] U.S. Cl. .................................. 209/250; 209/246; 209/315; 209/318; 209/414; 209/421
[58] Field of Search ............................. 209/3, 21–23, 209/28–31, 36, 37, 250, 246, 312, 315, 318, 420, 421, 414, 412, 409

[56] References Cited

U.S. PATENT DOCUMENTS

| | | | |
|---|---|---|---|
| 2,544,616 | 3/1951 | Sartorius | 209/3 X |
| 2,657,797 | 11/1953 | Ledgett et al. | 209/37 X |
| 3,409,126 | 11/1968 | Kennedy | 209/12 |
| 3,439,806 | 4/1969 | Kass et al. | 209/420 X |
| 3,662,886 | 5/1972 | Kennedy | 209/30 X |
| 4,000,061 | 12/1976 | Bowling et al. | 209/21 |

*Primary Examiner*—Ralph J. Hill
*Attorney, Agent, or Firm*—Hill, Van Santen, Steadman, Chiara & Simpson

[57] ABSTRACT

A mobile vehicle having self-contained apparatus for classifying, cleaning and reconstituting granular or pelletized materials, such as catalysts used in chemical plants, without polluting the surroundings, is adapted to travel from plant to plant over conventional highways and quickly placed in operating condition to remove contaminated granular materials from their beds or towers in chemical plants even when hot and process the materials to remove dust and undersized particles, to classify the granules into batches of different sizes for reuse and to filter out pollutants to protect the surrounding atmosphere. The apparatus includes cyclone and bag filters, classifying screens, power driven equipment for creating airstreams picking up the contaminated granular material from its source to propel it through the cyclone separator and convey the separated dust particles through a bag filter before releasing the filtered air to the atmosphere while the separated granular material is fed by gravity to classifying screens from which the different sized screenings are discharged into bins while an airstream pulls dust particles from the screens through another bag filter before discharging the air. The vehicle stores some of the apparatus in a compact low level position and has a crane for setting up the stored apparatus in upright operating position. Bins for the cleaned and classified granular materials are arranged for nesting together during transportation and are easily positioned by the crane for receiving the granular materials from the classifying screens. A second vehicle may be provided to transport the nested bins.

20 Claims, 10 Drawing Figures

Fig 7

MOBILE NON-POLLUTING CLEANING AND PROCESSING APPARATUS AND METHOD

FIELD OF THE INVENTION

This invention relates to the art of cleaning and classifying granular or pelletized materials such as, for example, are used as catalysts in the chemical industry and is particularly concerned with a highway-type vehicle equipped with separating, filtering, and classifying apparatus which is easily set up on the vehicle to provide a complete plant at the source site which will deliver the cleaned and classified material at the site for immediate reuse. The invention minimizes down time in the chemical process involving the use of the catalyst.

DESCRIPTION OF THE PRIOR ART

Catalyst activity in chemical plants is proportional to the ability of the catalyst to chemisorb reacting species and thus will increase as surface area and diffusion within pores increases. Therefore the catalysts are conventionally supported on porous materials such as mica, vermiculite, sand, glass spheres and in many chemical processes are formed into spheres or rods by rolling, pelletization, or extrusion. For example, in a sulfur burning inter-pass-absorption sulfuric acid plant, a catalytic converter containing vanadium pentoxide with a potassium promotor on a silica carrier receives a high temperature gas stream of sulfur dioxide, air and steam forming the sulfuric acid at high temperatures. The pellets become very hot, will crumble and deteriorate and the convertors become clogged although the catalyst is not destroyed. Heretofore, cleaning of such convertors was accomplished with makeshift on-site devices resulting in pollution of the atmosphere and requiring investment in stand-by cleaning equipment, much manual labor and, appreciable down-time for the plant. The present invention eliminates pollution, minimizes labor requirements, avoids requirements for idle stand-by equipment, and minimizes the down-time for the chemical plant by providing a high velocity airstream process and apparatus capable of handling hot granular or pelletized catalytic material in a continuous flow, delivering cleaned and classified granules or pellets for immediate reuse, and discharging only filtered air free from particulate pollutants.

SUMMARY OF THE INVENTION

According to this invention one or more highway vehicles carry apparatus in a compact stored condition together with a crane assembly which will quickly set up the apparatus for operation adjacent the source of a dry granular material, such as a catalyst convertor, to be cleaned and classified for reuse, and quickly placed back on stream in a chemical plant. The preferred apparatus includes a crane, a cyclone separator, bag filter units, classifying screens, a positive displacement blower for creating a main high pressure airstream for picking up and moving the material through the cyclone and one of the bag filter units, a fan for creating a secondary lower pressure airstream for aspirating dust from the screens, conveyors for discharging the classified screenings, a power plant, and bins for receiving the cleaned and classified material which are easily manipulated by the crane to selectively return materials to their source such as catalyst convertors or towers. The main or high pressure airstream develops a pressure drop or vacuum of about 15 inches of mercury and moves at a velocity of about 3000–3500 c.f.m. while the secondary or aspirating airstream operates at a much lower vacuum of about 1.5 inches mercury but at a higher velocity of about 5000–6000 c.f.m.

The term "granular" is used herein in a broad sense to include any particulate material such as grains, pellets, chunks, lumps, small rods, spheres, and the like.

The apparatus of this invention only requires the services of several skilled operators who can also serve as drivers of the vehicles and any additional labor desired at the plant site can be furnished by available maintenance workers at the plant.

It is then an important object of this invention to provide a method and mobile apparatus which will clean and classify granular materials, such as pelletized catalysts, at a chemical plant site without polluting the atmosphere.

Another object of this invention is to provide a mobile machine adapted to travel on conventional highways with separating, filtering, and classifying apparatus mounted thereon in compact condition and having a crane for erecting the apparatus at a materials source site to clean and classify granular materials for reuse at the site without releasing contaminants to the atmosphere.

Another object of the invention is to provide a highway vehicle with a cyclone separator, a plurality of bag filters, a classifying screen unit, and power driven air circulating means to pull granular material through the apparatus for cleaning, separation, and filtration of all particulate matter before discharging the airstream to the atmosphere.

A specific object of this invention is to provide a method of cleaning, classifying and filtering dust from granular catalysts which can be performed at a plurality of remote sites and using an airstream to convey the catalysts.

Another specific object of this invention is to provide a complete granular catalyst cleaning and classifying plant on a highway vehicle which can be driven alongside of a catalytic convertor and develop an airstream which will pull granular catalysts from the convertor through a cyclone separator for removing fines from the material, will filter the fines from the airstream before discharging the air back to the atmosphere, will separate the granular material into separate bins each containing granules of uniform size and will empty the bins back into the convertor to form a desired stratified catalyst bed therein.

A further specific object of the invention is to provide a completely self-contained mobile plant for reconstituting granular catalysts by sweeping the granules from the catalyst convertor in an airstream through a plurality of cleaning operations without discharging particulate matter to the atmosphere.

Other and further objects of this invention will become apparent to those skilled in this art from the following detailed description of the annexed sheets of drawings which, by way of a preferred example only, illustrate one embodiment of the invention.

GENERAL DESCRIPTION

A mobile machine 10 of FIGS. 1 and 3–6 includes a self-propelled tractor 11 and low level trailer 12 detachably connected to the tractor 11 through a conventional "fifth wheel" 13. The tractor 11 has a chassis 14 on the front end of which is mounted, a prime mover such as a diesel engine 15 and a driver's cab 16. Front steerable wheels 17 and rear driven wheels 18 support the chassis 14.

Figure 1:
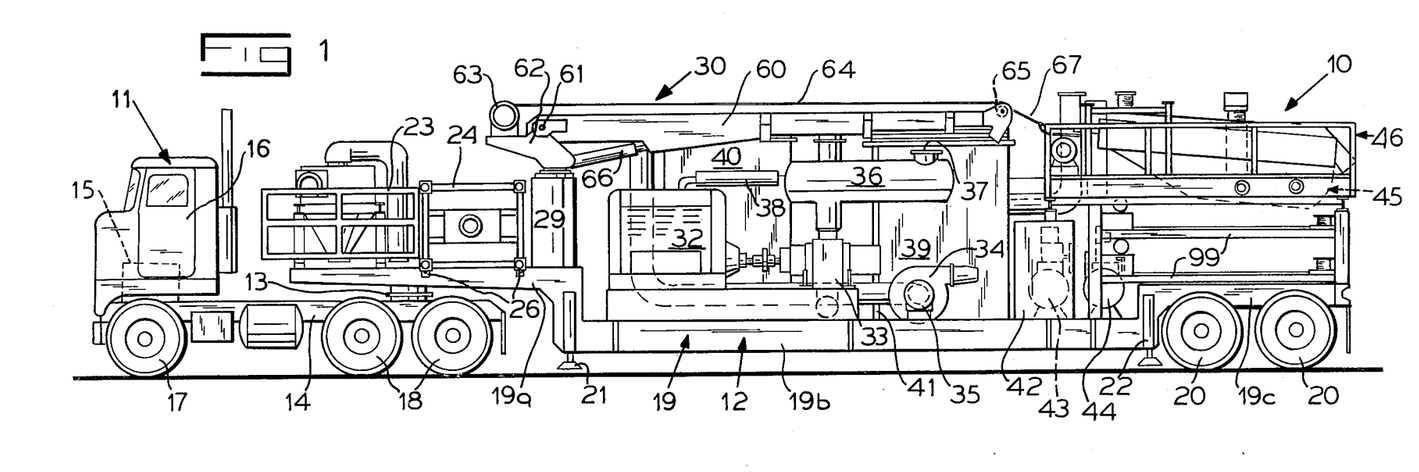
FIG. 1 is a side elevational view of the mobile machine of this invention.

The low level trailer 12 has a chassis 19 with a raised front platform section 19a overlying the chassis 14 and connected thereto by the fifth wheel 13, a low level elongated central portion 19b, and a raised rear end platform portion 19c overlying the rear wheels 20.

Outriggers 21 are provided on the sides of the chassis 19 alongside the portions which connect the low level central portion 19b with the higher level platform sections 19a and 19c. These outriggers 21 are actuated by screw jacks 22 to press the feet thereof against the ground thereby stabilizing the entire chassis against movement relative to the ground when the machine 10 is set up for operation.

Figures 3, 4:
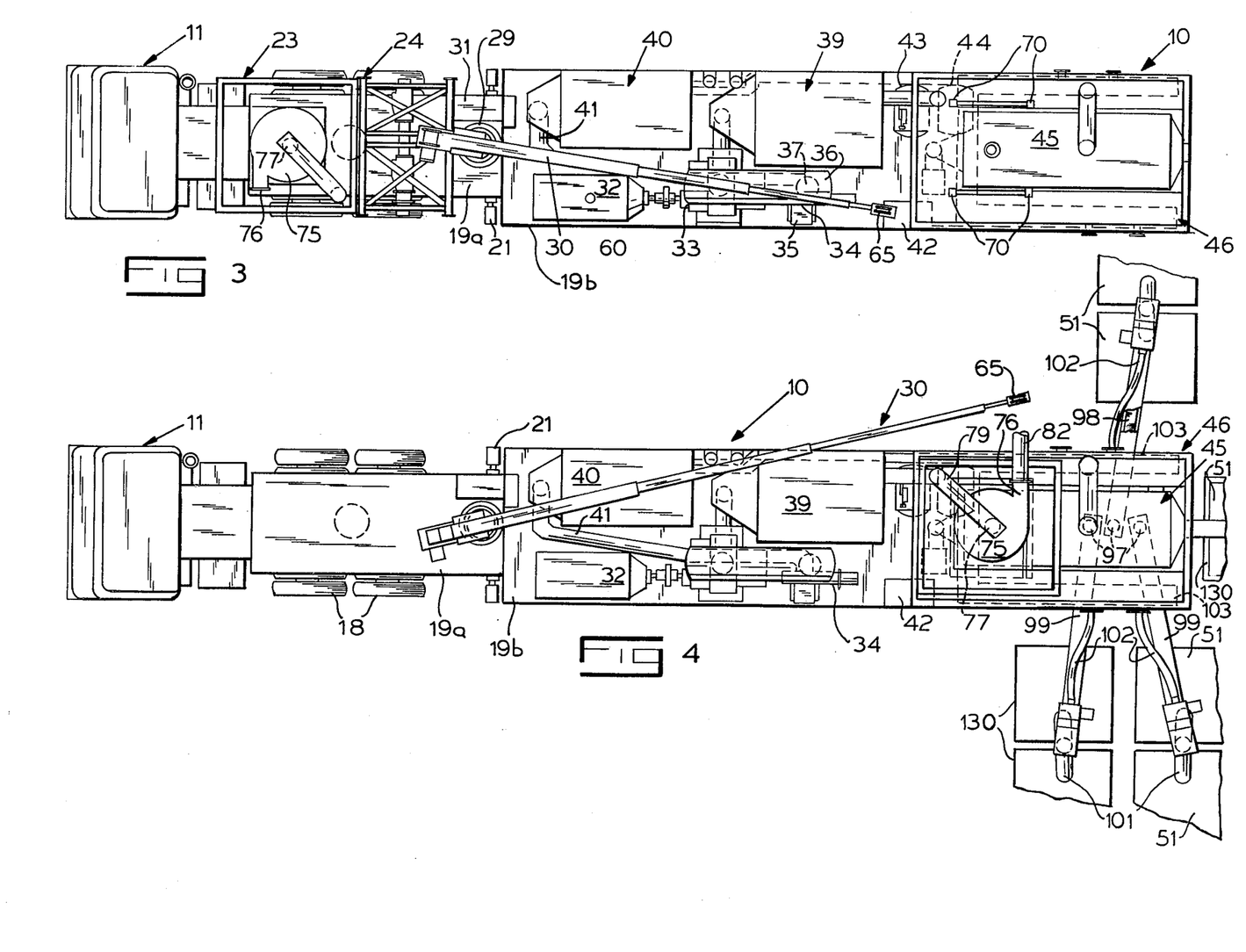
FIG. 3 is a plan view of the machine of FIG. 1.
FIG. 4 is a plan view similar to FIG. 3 but showing the apparatus on the machine erected for operation.
Figures 6, 10:
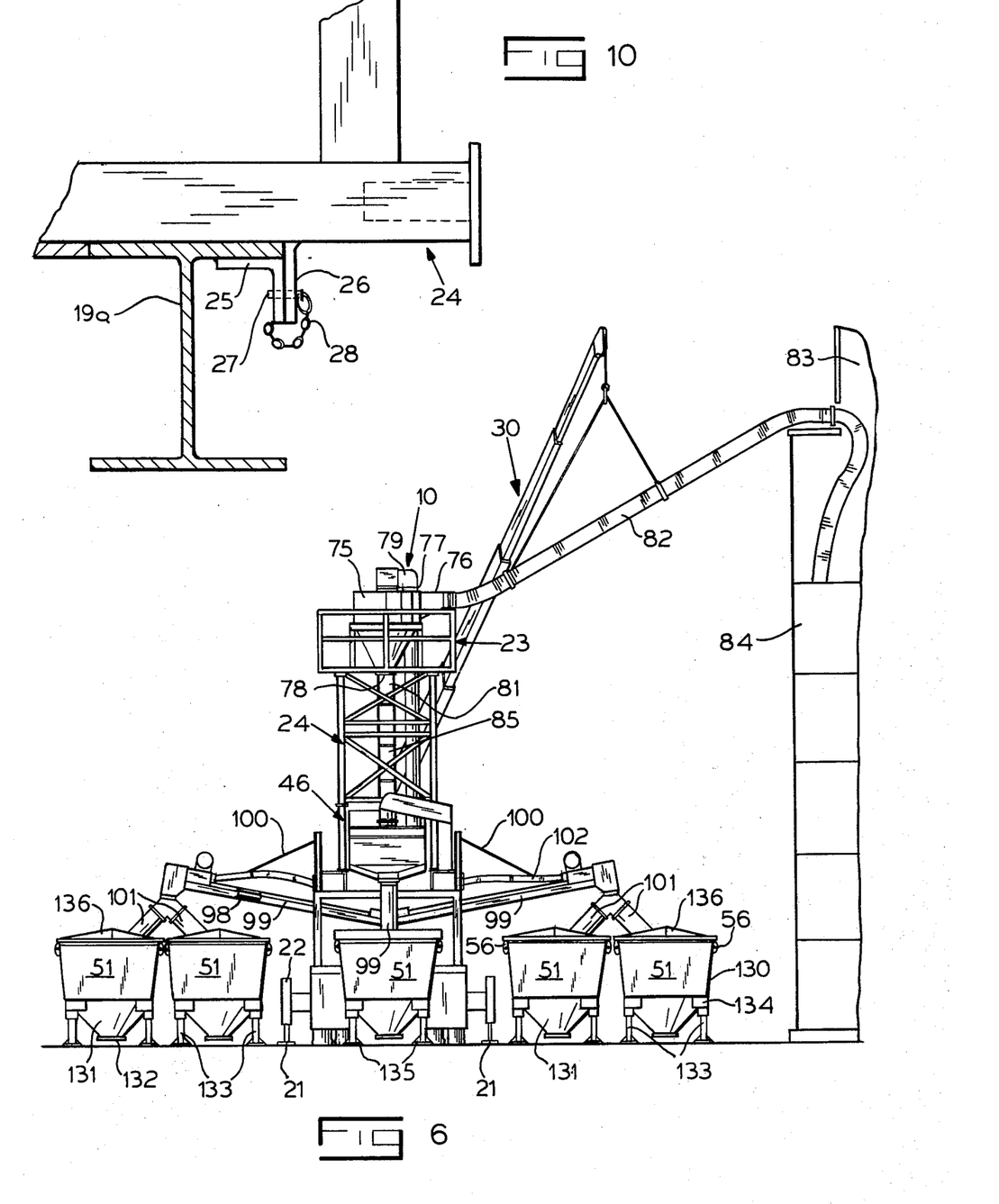
FIG. 6 is an end elevational view of the machine of FIGS. 4 and 5 in operating position.
FIG. 10 is a fragmentary side elevational view with parts in section illustrating the mounting of scaffold components in stored condition on the machine.

In the compact travel condition of the machine 10 as shown in FIGS. 1 and 3, the front platform portion 19a of the chassis 19 carries a cyclone separator frame 23 and a valved air lock frame 24. These frames 23 and 24 are positioned in tandem relation and as illustrated in FIG. 10 they are locked to the chassis 19a. Thus as shown in FIG. 10 a chassis I-beam 19a has brackets such as 25 secured thereon which are overlapped by plates such as 26 depending from the frame 24 and a pin 27 extends through registering holes in the brackets and plates to detachably anchor the frame to the chassis. A chain 28 carried by the bracket 25 supports the pin 27 for easy access when needed.

The chassis portion 19a also supports an upright pedestal 29 of a crane assembly 30.

In addition, as shown in FIG. 3, the upright portion of the platform section 19a supports a disconnect switch box 31 which receives electrical current from an outside source and services the electric motor driven parts of the apparatus.

As shown in FIGS. 1 and 3 a power plant such as a diesel engine 32 is mounted on the low level central section 19b of the chassis 19 and is coupled to a high positive displacement rotary piston pressure blower 33, commonly known as the Roots type. A fan 34 is mounted rearwardly of the blower 33 and is driven by an electric motor 35.

The blower 33 discharges through a silencer manifold 36 to the atmosphere at 37. The diesel engine exhaust is directed through a muffler 38.

The suction side of the blower 33 is connected to the discharge side of a high pressure bag filter unit 39. The blower thus draws an airstream through the filter unit 39 which is discharged through the manifold muffler 36 to the atmosphere at 37.

A second lower pressure bag filter unit 40 is mounted in front of the unit 39 and has its outlet connected through a conduit 41 with the suction side of the fan 34.

A control panel box 42 is mounted on the chassis portion 19b.

A pair of air compressors 43 and 44 are positioned on the chassis section 19b rearwardly of the bag filter unit 39.

A multiple screen classifying unit 45 is mounted on the raised chassis platform portion 19c and a cat walk framework 46 surrounds the screen unit 45 and provides a base for the frame 24 as will be more fully hereinafter described.

It will be noted from FIGS. 1 and 3 that all of the apparatus mounted on the chassis 19 of the trailer is compactly arranged at a low level and at a narrow width so that the vehicle may travel over conventional highways and under viaducts for ease in transportation between use sites.

THE BIN CARRYING VEHICLE

Figure 2:
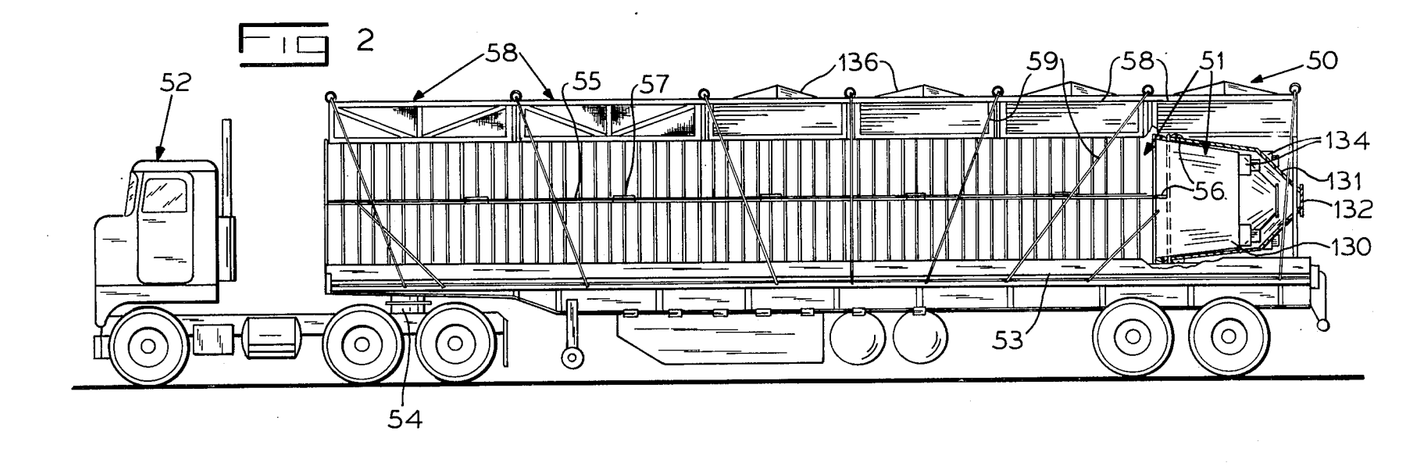
FIG. 2 is a side elevational view of a follow-up mobile machine for supplying bins to the machine of FIG. 1.

As shown in FIG. 2, a second mobile machine 50 is provided to supply bins 51 for use in the operation of the machine 10. This vehicle 50, is composed of a conventional tractor 52 and trailer 53 connected therewith through a fifth wheel 54. The trailer provides a flat platform supporting the bins 51 in a laid down position with all of the bins being nested together to form a continuous inter-fitted stack.

Cables such as 55 are threaded through ears 56 on the sides of the bin with the ends of each cable being anchored to the front and rearmost bins of the stack and tightening devices such as 57 are provided to shorten the cables for pulling the bins together into a tight stack. If desired the cables 55 can be provided in short length sections each drawing together a group of nested bins.

Flat trays or bins 58 are mounted on top of the bins 51 in tandem relation for storing bin covers, bin legs, and the like as will be hereinafter described. Tie down cables 59 are draped over the trays 58 and anchored to the trailer platform 53 to secure the entire assembly to the platform.

THE CRANE

The crane 30 is rotatably carried on the pedestal 29 and has an extensible boom 60 composed of telescoping sections with the base end section pivoted at 61 on a head 62 which rotates on top of the pedestal 29 and carries a winch 63 for a cable 64 that extends over the boom and around a pulley 65 on the free end of the boom. A hydraulic jack 66 controls the tilting of the boom about the pivot 61.

In the stored travel condition of the machine 10 the boom sections are retracted and the boom lies across the tops of the apparatus on the chassis portion 19b of the trailer with its pulley end 65 resting on underlying apparatus and its cable 64 anchored at 67 to the frame 46. In this telescoped lowered position of the boom it lies well within height and width requirements for a highway trailor.

THE FRAMES

Figures 5, 9:
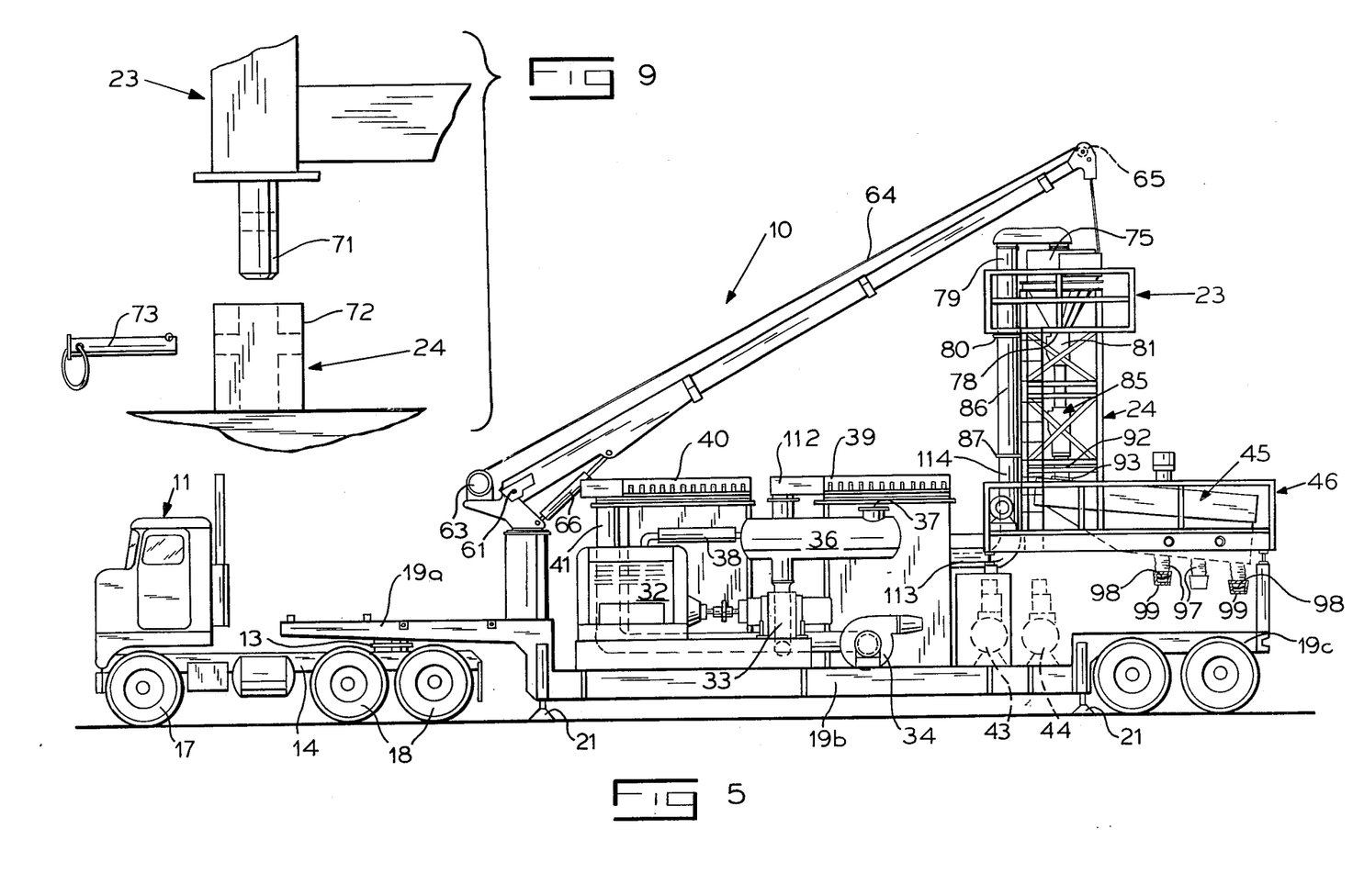
FIG. 5 is a side elevational view of the machine of FIG. 4 with the apparatus in operating position.
FIG. 9 is a fragmentary exploded view of inter-fitting scaffold components for erecting the apparatus of the machine.

The cat walk frame 46 has four pads 70 at its top forward end as shown in FIG. 3 adapted to receive and support the four corner legs of the frame 24 so that this frame section will stand upright on top of the frame 46 as shown in FIGS. 5 and 6. The crane 30 is operated to lift the frame 24 from its stored condition of FIG. 1 to its upright condition of FIGS. 5 and 6.

The frame 23 is also moved from its stored condition of FIGS. 1 and 3 to its upright use condition of FIGS. 5 and 6 on top of the four legs of the frame 24.

The frame sections 23 and 24 are easily fitted together by pins such as 71 depending from the four legs of the frame 23 as shown in FIG. 10 and fitting into bosses 72 on top of the frame 24 with pins such as 73 insertable through aligned holes in the pins 71 and bosses 72 to lock the two frame sections together in upright position as shown in FIGS. 5 and 6. The frame section 24 can be mounted on the frame section 46 in the same manner or by any other bolts or fasteners such as is desired.

THE CYCLONE SEPARATOR

The scaffold like frame 23 surrounds and supports a cyclone separator 75 having a tangential inlet 76 at the top thereof, an air outlet 77 at the center of the top thereof, and a conical bottom with an outlet 78. The air outlet 77 exhausts to a conduit 79 extending over the top of the frame 23 and downwardly through the frame to a coupling 80. The outlet 78 discharges into a surge hopper 81.

The inlet 76, as illustrated in FIG. 6 is coupled with a flexible conduit 82 which can be held in operating position by the crane 30 for receiving the granular catalyst material from an elevated tower or convertor 83 of a chemical plant. The conduit 82 can extend into the convertor for positioning its open mouth on top of the catalyst bed 84 therein to sweep the granular catalyst into the airstream that is developed in the conduit 82 as will be hereinafter described. The hose like conduit 82 is lowered into the tower as the catalyst bed 84 decreases in height due to the removal of the granules from the top of the bed.

THE AIR LOCK

The scaffold like frame 24 supports in an upright position in the center thereof, an air lock device 85 and also supports in an upright position, along the side thereof, a conduit 86 mating with the conduit 79 through the coupling 80 and also having a bottom coupling 87.

Figure 8:
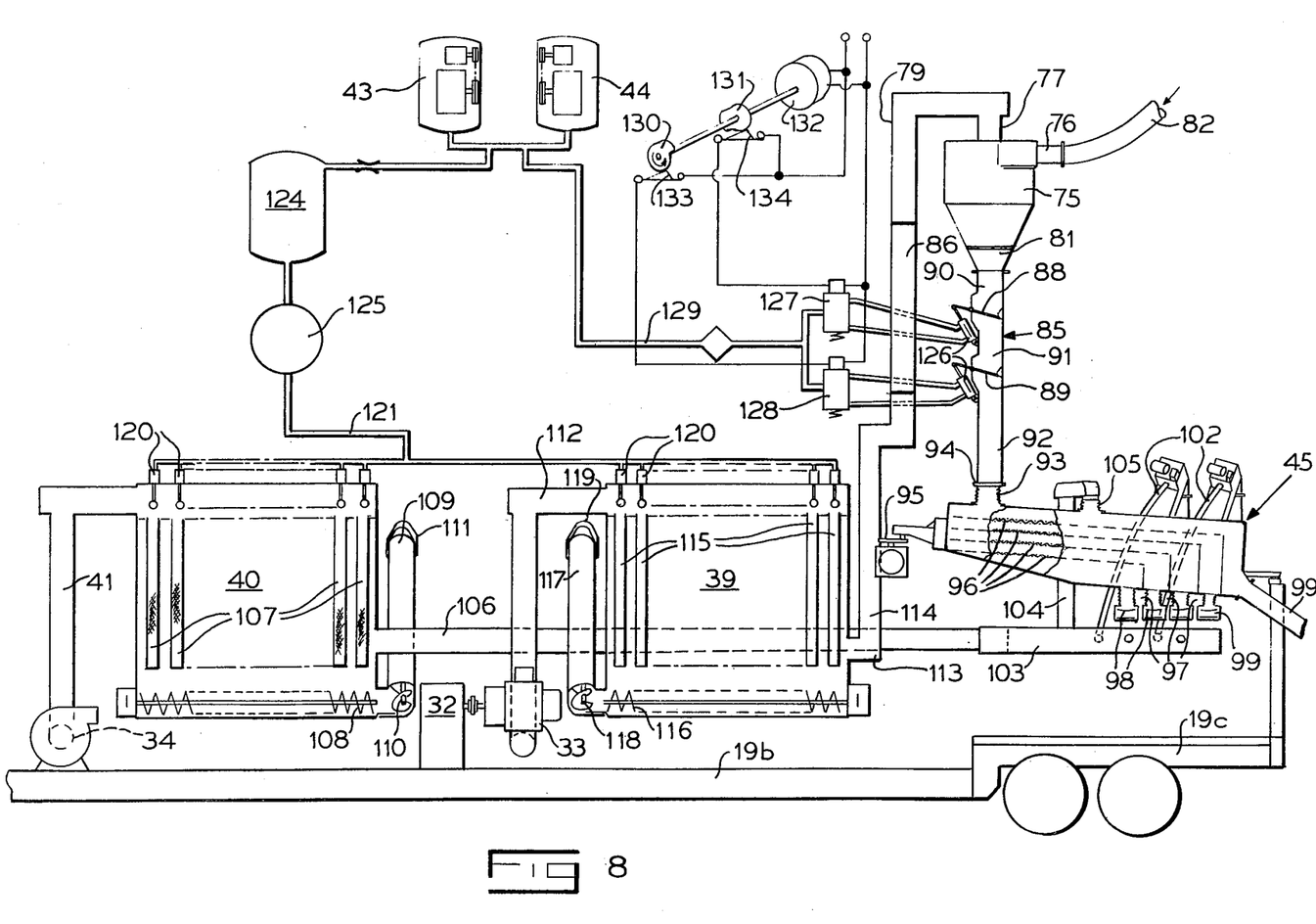
FIG. 8 is a diagrammatic view of the apparatus of the machine.

The air lock device 85 as shown in FIG. 8 has a pair of spaced superimposed gates or valves 88 and 89 providing an upper chamber 90 receiving granular material from the surge chamber 81 and a bottom chamber 91 receiving the material from the chamber 90. Thus material in the upper chamber 90 is discharged into the lower chamber 91 with the valve 88 opened and the valve 89 closed. After this discharge, the valve 88 is closed so that the chamber 90 may again be filled with the material from the surge hopper 81. The material in the chamber 91 is then discharged by opening the valve 89 to fall through a conduit 92 to the inlet 93 of the classifying screen unit 45. A coupling 94 detachably connects the conduit 92 to the inlet 93.

THE CLASSIFYING SCREEN

The classifying screen unit 45, as explained above, has a top inlet 93 receiving the discharge from the air lock 85. This inlet 93 is positioned at the front end of the unit 45 and is flexible to accommodate shaking of the entire unit by an eccentric drive 95 shown in FIG. 8.

The unit 45 has a plurality of superimposed inclined screens 96 along the length thereof. The screens are of decreasing length to discharge the retained granules or particles at their rear ends through separate outlets 97. As shown in FIG. 8 the top screen 96 discharges granules which are too large to pass therethrough to a rear outlet chute 99 while the screenings therefrom drop to the underlying screen with the granules retained thereon discharging to a lateral chute 99. Any desired number of screens can be used to provide batches of granules of desired size. The outlets 97 have flexible hose connections to the inner ends of the chutes 99 which are pivoted about the outlets 97 as illustrated at FIG. 4 and can be swung to selected discharge positions around the rear end of the machine 10. Belts 98 in the chutes convey the granules therethrough.

In the travel condition of the machine, the chutes 99 are stored alongside the unit 45 as shown in dotted lines in FIG. 4.

As shown in FIG. 6, the chutes 99 are supported on cables 100 from the frame 46 and have their discharge ends elevated from their inlet ends so that the conveyor belts 98 will transfer the screenings through the chutes along upward paths to swivelly mounted discharge nozzles 101 at the ends of the chutes each of which has two outlets controlled by a gate or valve to simultaneously or selectively discharge into adjacent bins 51. These outlet nozzles are evacuated through suction hoses 102 for preventing dust particles from entering the atmosphere.

As shown in FIG. 8 the hoses 102 discharge into a conduit 103 underneath the unit 45. In addition the top of the housing of the unit 45 is connected to this conduit 103 by a conduit 104 and a flexible coupling 105. The conduits and hoses evacuate the unit 45 to prevent discharge of dust to the atmosphere.

THE LOW PRESSURE BAG FILTER UNIT

As explained above the low pressure bag filter unit 40 has an outlet connected through a conduit 41 to the suction side of the fan 34. This unit has an inlet 106 connected to the conduit 103 to pull dust laden air from the classifying screen unit 45 and the discharge nozzles 101 on the ends of the chutes 99 into the bag housing where the air must pass through the bag filters 107 suspended in the housing before it can reach the outlet 41. The dust collected on the bags 107 will drop to the bottom of the bag housing to be conveyed by a longitudinal auger 108 discharging into an upstanding conduit 109 equipped with a lifting auger 110 discharging to a side outlet 111 which can be emptied into a bin.

THE HIGH PRESSURE BAG FILTER UNIT

As explained above, the high pressure bag filter unit 39 is evacuated by the powerful blower 33. Thus the bag filter unit 39 has an outlet 112 connected to the suction side of the blower 33.

The unit 39 also has an inlet 113 connected through an upstanding conduit 114 to mate with the gland 87 at the bottom of the conduit 86.

Thus air is pulled from the top of the cyclone separator 75 through the conduits 79, 86, 114, inlet 113 and bag housing 39 to exit at the outlet 112 of the housing. However before the air can reach the outlet 112 it must pass through filter bags 115 in the housing. Particulate matter collected on the bags 115 drops to the bottom of the housing where it is removed by a longitudinal auger 116 to an upstanding discharge conduit 117 containing a lifting auger 118. The conduit 117 discharges to an outlet 119 at the side of the machine where the dust material can be collected in a bin or other collector with the dust material from the outlet 111.

THE BAG FILTER CLEANERS

Back flow air cleaning apparatus is provided to discharge accumulated particulate material off of the bag filters 107 and 115. This apparatus, as shown in FIG. 8, includes valves 120 admitting air selectively into the tops of the bag filter units 39 and 40 for discharge through the bags therein to blow the particulate matter off of the surfaces of the bags. These valves are connected to a high pressure air line 121 supplied from the tandem compressors 43 and 44. It is preferred to use a pair of such compressors with one of them always available as a stand-by unit and as an additional source of compressed air when one of the units is not sufficient. The compressed air passes through a filter or chiller 124 to remove moisture and then the dried air is fed to a storage tank or accumulator 125 which supplies the valves 120.

It will be understood that the back flow bag cleaning apparatus is only periodically used to unclog the bags.

THE AIR LOCK ACTUATORS

As also shown in FIG. 8, the gates or valves 88 and 89 in the air lock unit 88 are operated by pneumatic jacks 126 under the control of solenoid valves 127 and 128 which receive air from a compressed air line 129 supplied by the air compressors 43 and 44. The valves 127 and 128 are sequentially actuated by motor driven cams 130 and 131 driven by a motor 132 to open and close switches 133 and 134.

The arrangement is such that one of the valves 88 or 89 is always closed so that when the top valve 88 is opened the granular material from the surge chamber 81 will drop into the air lock chamber 91 and be sealed therein by the closed valve 89. When the material in the air lock chamber 81 is to be fed to the classifying screen unit 45, the valve 88 is closed before the valve 89 opens and the granular material from the cyclone separator collects in the chamber 90 above the valve 88.

THE BINS

The bins 51 are easily unloaded from the vehicle 50 by removal of the cables 55 and 59 and removing the trays 58.

These bins 51 are preferably formed of sheet steel material or the like and as shown in FIGS. 2, 4 and 6 have square tapered top portions 130 sloped at a nesting angle to conical converging bottoms 131 with central bottom openings closed by slides 132. Demountable legs 133 fit in sockets 134 at the four corners of the bottom of the square top portion 130. These legs have ground engaging feet 135 providing a stable support for the bins. These feet 135 of the legs depend below the bottoms of the conical portions 131 to hold the slide closures 132 above the ground.

Lids 136, preferably formed of lightweight material such as a fiberglass, are provided for the bins. These lids have openings for receiving the discharge nozzle outlets 101 at the ends of the discharge chutes 99.

The lids 136 can be stacked in the trays 58 together with the legs 133 in the knocked down transporting condition of the bins.

The crane 30 positions the bins as desired around the machine 10 with the cable 64 anchored to the ears or lugs 56 on the bins. When the bins are filled with the classified granules the crane is useful to lift the loaded bins to the top of the catalyst convertor or tower whereby opening of the slides 132 will discharge the classified granules into the tower.

THE MATERIAL AND AIR FLOW PATHS

Figure 7:
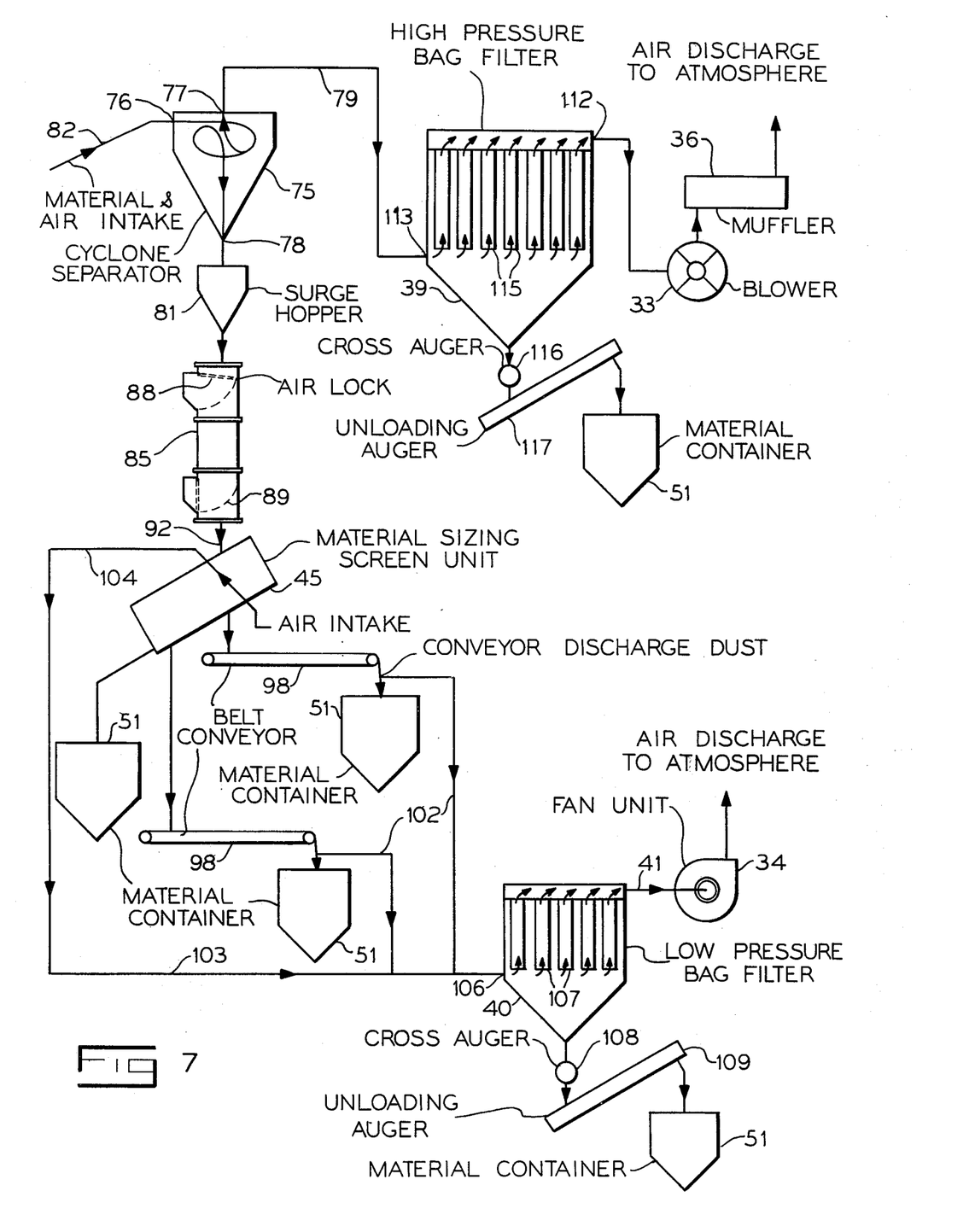
FIG. 7 is a schematic view of the material and air flow through the apparatus of the machine.

As shown in FIG. 7, the granular material to be cleaned and classified by the method and apparatus of this invention is swept through the intake conduit 82 to the tangential inlet 76 of the cyclone separator 75 where the solids material is separated by centrifugal force from the airstream to fall to the bottom outlet 78 where it is collected in a surge chamber 81 and then fed to the air lock under the control of the valves or gates 88 and 89 which prevent back flow.

The cyclone separator 75 has the air exhausted from the top outlet 77 thereof and through the high pressure bag filter unit 39 by the positive displacement blower 33 which is driven by the diesel engine. The high pressure airstream flows from the inlet 113 of the filter unit 39 through the bags 115 to the outlet 112 and then to the suction side of the blower 33 to be discharged through the muffler 36 to the atmosphere.

The filtered dust or particulate matter collected on the bags 115 drops to the bottom of the unit 39 and when a batch of the dust is collected in this bottom, the auger in the conduit 116 is actuated to transfer the material to the inclined conduit 117 from which it is discharged by an unloading auger to a collecting bin 51.

The separated granular material from the air lock 85 is fed through conduit 92 to the intake of a material sizing screen or classifying screen unit 45. Air from the outlets of the unit 45 is pulled through the unit 45 by the fan 34 through conduits 104, 103, and 41. Thus air is swept through the screens and is also swept through the hoses 102 to evacuate the discharge ends of the conveyor chutes 99 so that dust will not be discharged to the atmosphere as the material is deposited by the conveyor belts 98 into the bins 51.

The low pressure bag filter 40 has an inlet 106 so that the dust laden air from the screen unit 45 and the discharge ends of the conveyor chutes 99 has the dust filtered therefrom on the bags 107. This dust then drops to the bottom of the unit 40 and is periodically removed therefrom by the cross auger in the outlet conduit 108 which discharges to the unloading conduit 109 where the unloading auger raises it to the outlet for collection in a bin 51.

From the somewhat simplistic illustration of FIG. 7 it will thus be understood that a powerful blower 33 provides the air sweep for moving the granular material from its source to the cyclone separator where dust or fine particulate matter is centrifugally separated therefrom. The granules then are separated into batches of different sizes by the classifying screen unit 45. A fan unit pulls air through the screen unit and discharge outlets thereof so that dust will not be released to the atmosphere. Likewise the dust in the main airstream from the cyclone separator is filtered from the air by the bag unit 39 before it reaches the blower 33.

The two airstreams created by the blower and the fan thus have all dust or particulate matter removed therefrom before the air is released to the atmosphere.

SUMMARY

From the above descriptions it will be clear that the apparatus and method of this invention has complete mobility. The apparatus is carried on the trailers of one or two trucks and has a compact storage position which does not exceed the height, width, and length regulations for trailer trucks.

The apparatus is quickly and easily set up for operation adjacent to a source of granular material, such as a catalytic convertor, filter bed, or the like containing used catalyst pellets and the like granular material contaminated with fines and settled or packed to interfere with flow through the bed. The apparatus develops a high pressure airstream with a suction conveying range of from 5 to 15 inches of mercury and flow rates of about 2500–3500 c.f.m. The high pressure airstream sweeps the material from its source through the apparatus where it is cleaned and screened into batches of granules of desired sizes. These granules are collected in separate bins which are easily moved to discharge through the bottoms thereof into the convertor of filter bed. The granules of different sizes can be successively deposited in the bed to create a stratified bed with zones of granules of different sizes.

A lower pressure airstream is maintained with a suction conveying range of from 0.5 to 1.5 inches of mercury and a higher velocity of about 5000–7000 c.f.m. This lower pressure airstream aspirates dust from the screens and discharge outlets.

The airstreams are filtered through bag filters before the air is discharged back to the atmosphere so that the atmosphere is protected from pollutants that might be picked up in these airstreams.

The apparatus is capable of handling hot granular material so that a cooling down period is not required before starting the cleaning and classifying treatment of the granular catalysts. Down-time for the chemical plant using these catalysts is thus minimized.

Since the apparatus can travel to the source of material to be cleaned and classified and can place the treated material back into operation, permanent standby cleaning equipment is eliminated together with most of the labor required for use of this equipment.

It will be understood that while only a single enbodiment of the invention has been illustrated on the drawings, many variations of this invention may be made without departing from the principles and scope of the invention.

I claim as my invention:

1. A mobile machine for treating granular materials at a use site for reuse at the site without polluting the atmosphere which comprises, an apparatus equipped vehicle adapted to travel over conventional highways with the apparatus in compact stored condition, said apparatus including a power unit, a blower driven by said unit having a suction side and a discharge side open to the atmosphere, a motor, a fan driven by said motor, a low pressure bag filter unit having an inlet and an outlet, a high pressure bag filter unit having an inlet and an outlet, a moveable cyclone separator section having a top air and materials inlet, a bottom materials outlet, and a suction outlet, a moveable multiple discharge valve section having a top valve receiving materials from the bottom materials outlet of the cyclone separator section, a bottom valve spaced from the top valve and providing a chamber between the valves, and a bottom outlet, a swingable extensible boom assembly adapted to move said cyclone separator and discharge valve sections from a compact stored position on the vehicle to an upstanding operating position with the bottom materials outlet of the cyclone separator section discharging to the top valve of the multiple discharge valve section, a multiple screen classifying screen unit positioned to receive granular material from the bottom outlet of the multiple discharge valve section when in operating position and having a plurality of separate discharge outlets for different size screenings, an inlet conduit positioned by said boom and cable assembly to feed granular material into the top inlet of the cyclone separator section, conduit means connecting the suction side of the blower with the outlet of the high pressure bag filter unit, additional conduit means connecting the inlet of the high pressure bag filter unit with the suction outlet of the cyclone separator section to pull air through the inlet conduit and the high pressure bag filter unit to filter the air before reaching the discharge side of the blower, additional conduit means communicating with the classifying screen unit and the inlet of the low pressure bag filter unit, conduit means connecting the outlet of the low pressure bag filter unit with the intake of said fan for discharging filtered air to the atmosphere, and conveyors for moving the different size screenings from the separate discharge outlets of the classifying screen unit to spaced positions alongside the machine.

2. The machine of claim 1 including a surge chamber between the bottom materials outlet of said cyclone separator and the inlet of said discharge valve section.

3. The machine of claim 1 including inter-fitting pin and socket means for mounting the scaffold frameworks in superimposed relation.

4. The machine of claim 1 wherein the conduit means having the inlet adapted to overlie the source of granular material is flexible.

5. The machine of claim 1 wherein the blower maintains an airstream with a suction conveying rate of about 5 to 15 inches of mercury.

6. The machine of claim 1 wherein the fan maintains a high velocity aspirating airstream.

7. Apparatus adapted for the cleaning and classifying of granular catalyst materials which comprises first and second airstream conduits, each having an inlet and an outlet, a blower for maintaining a high pressure air flow through said first airstream conduit, a fan for maintaining a low pressure air flow through said second airstream conduit, said inlet of said first airstream conduit adapted to receive granular catalyst material from a source, a cyclone separator in said first airstream conduit receiving the granular material from said inlet and separating the granules from dust, a first bag filter unit in said first airstream conduit receiving dust laden air from said cyclone separator, silencer means receiving filtered air from said blower, a multiple screen classifying unit in said second airstream conduit receiving air from the atmosphere, said classifying unit having an inlet receiving granular material from said cyclone separator and a plurality of outlets discharging classified granular materials, a filter in said second airstream conduit receiving dust laden air from said classifying screen unit, and said fan discharging filtered air from said filter unit in said second airstream to the atmosphere.

8. The apparatus of claim 7 wherein the first airstream conduit is separated from the second airstream conduit by an air lock between the cyclone separator and the screen classifying unit.

9. The apparatus of claim 7 wherein the multiple screen classifying unit has a separate outlet for each screen receiving granular catalyst material retained on the screen.

10. The apparatus of claim 7 including an eccentric drive for shaking the multiple screen classifying unit.

11. A mobile machine sized for highway travel adapted to be quickly set up for operation at the site of a source of granular catalyst material to clean and classify the material for reuse at the site which comprises a tractor, a trailor propelled by said tractor, a cyclone separator, an air lock, a pair of bag filter units, a classifying screen unit, a blower, a power plant driving said blower, a fan, and a crane mounted on said trailor, scaffold framework for said cyclone separator, scaffold framework for said air lock, scaffold framework for said classified screen unit, means for locking said separator framework and said air lock framework in compact position on said trailor, means for mounting said air lock framework on said classifying screen framework, means for mounting said separator framework on said air lock framework, means for operating said crane to move the separator and air lock frameworks from stored position on said trailor to superimposed operating position on said screen framework, said cyclone separator having a tangential inlet, a top air outlet, and a bottom solids outlet, conduit means having an inlet adapted to overlie a source of granular material and an outlet communicating with said tangential inlet of the separator, conduit means connecting the air outlet of the separator with one of said bag filter units, conduit means connecting said one bag filter unit with the suction side of said blower, silencer means connecting the discharge side of said blower with the atmosphere, conduit means connecting said screen unit with the other of said bag filter units, conduit means connecting the said other bag filter unit with the suction side of said fan, said air lock receiving solids material from the bottom of said separator, said screen unit receiving the granular material from the air lock, mechanism for vibrating said screen unit, said screen unit having a plurality of discharge outlets each discharging material from a screen in said unit, and conduit means connecting said discharge outlets with said conduit means to said other filter unit.

12. The machine of claim 11 including pin and socket means for securing said frameworks in superimposed relation.

13. A mobile plant for cleaning and classifying granular material such as catalysts which comprises first and second vehicles sized for highway travel, said first vehicle having an apparatus thereon creating a first airstream receiving granular materials from a source, a separator in said first airstream, a first filter unit in said first airstream, a classifying screen unit receiving granular materials from said separator for classifying the materials into batches of different sizes, means for maintaining a second airstream through said classifying screen unit, a second filter in said second airstream, said classifying screen unit having a plurality of outlets for discharging granular materials of different sizes, said second vehicle having a plurality of nested together bins mounted thereon, and a crane on said first vehicle for transferring said bins from the second vehicle to positions around the first vehicle for receiving the classified granules from the outlets of the screen unit.

14. The plant of claim 13 wherein said bins have detachable legs and removable lids.

15. The plant of claim 13 wherein said bins have hopper bottoms with discharge outlets and slides control said outlets.

16. The plant of claim 13 wherein said first and second filter units are bag filter units.

17. The plant of claim 13 wherein the separator is a cyclone separator.

18. A machine for treating granular materials which comprises first means pulling air for maintaining a first airstream, second means pulling air for maintaining a second and independent airstream separate from said first airstream, a centrifugal separator in said first airstream centrifugally separating fines from granular material, an air lock device receiving said granular material from said centrifugal separator, filter means for said fines in said first airstream discharging filtered air to the atmosphere, a housing encased classifying screen unit in said second airstream receiving granular material from said air lock device, a filter in said second airstream receiving air from said classifying screen unit and discharging filtered air to the atmosphere, said screen unit having a plurality of discharge outlets for the classified granules, conveyors moving the granular materials from said outlets away from the machine, bins spaced around said machine receiving granular material from the conveyors, and hoses connecting the discharge ends of the conveyors with the second airstream pulling dust into said second airstream to prevent discharge of dust to the atmosphere as the material is deposited into the bins.

19. A machine for treating granular materials which comprises first means pulling air for maintaining a first airstream, second means pulling air for maintaining a second and independent airstream separate from said first airstream, a centrifugal separator in said first airstream centrifugally separating fines from granular material, an air lock device receiving said granular material from said centrifugal separator, filter means for said fines in said first airstream discharging filtered air to the atmosphere, a housing encased classifying screen unit in said second airstream receiving granular material from said air lock device, a filter in said second airstream receiving air from said classifying screen unit and discharging filtered air to the atmosphere, said screen unit having a plurality of discharge outlets for the classified granules, said machine mounted on a highway vehicle and having the separator and air lock transferrable from horizontal travel positions to upstanding operating positions on the vehicle, and a crane on the vehicle to transfer the separator and air lock from travel to operating positions.

20. The method of cleaning and classifying granular material which comprises pulling granular material from a source into a high pressure airstream, centrifugally separating the granular material from dust in said airstream, filtering the dust in said airstream, classifying the separated granules into a plurality of batches of different sizes, pulling dust from the granules being classified into a second and lower pressure airstream, filtering the dust from the second airstream, and aspirating air from the separated batches of the granules to avoid pollution as the granules are discharged.

* * * * *